United States Patent
Dorrer et al.

(10) Patent No.: US 6,885,490 B2
(45) Date of Patent: Apr. 26, 2005

(54) METHOD AND APPARATUS FOR CHARACTERIZING OPTICAL PULSES USING REDUCED COMPLEXITY CHRONOCYCLIC TOMOGRAPHY

(75) Inventors: Christophe J. Dorrer, Matawan, NJ (US); Inuk Kang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 167 days.

(21) Appl. No.: 10/427,839

(22) Filed: May 1, 2003

(65) Prior Publication Data

US 2004/0218930 A1 Nov. 4, 2004

(51) Int. Cl.[7] .......................... H04B 10/04; G02F 1/01
(52) U.S. Cl. ...................... 359/279; 359/278
(58) Field of Search ................. 359/279, 278, 359/237, 238, 181; 398/183, 185, 187, 188; 370/203, 206, 215; 342/192, 200, 201; 708/426; 385/1, 2, 3

(56) References Cited

U.S. PATENT DOCUMENTS 6,310,575 B1 * 10/2001 Chabah et al. .............. 342/162

6,741,763 B1 * 5/2004 Taylor .......................... 385/3

OTHER PUBLICATIONS

"Wigner Distribution Reconstruction From Two Projections", T. Alieva, et al., Proceedings of the 11th IEEE Signal Processing Workshop on Statistical Signal Processing, pp. 325–328 (2001).

* cited by examiner

Primary Examiner—Scott J. Sugarman
Assistant Examiner—Richard Hanig

(57) ABSTRACT

A method and apparatus for characterizing an optical pulse using a reduced complexity chronocyclic tomography is described. In one example, an optical pulse train is modulated using quadratic temporal phase modulation. A first spectral intensity of the optical pulse train is measured after a quadratic temporal phase modulation having a first amplitude. A second spectral intensity of the train of optical pulses is then measured in response to the quadratic temporal phase modulation having a second amplitude. At least one of the group delay and the spectral intensity associated with the train of optical pulses is computed using the first spectral intensity and the second spectral intensity.

21 Claims, 6 Drawing Sheets

METHOD AND APPARATUS FOR CHARACTERIZING OPTICAL PULSES USING REDUCED COMPLEXITY CHRONOCYCLIC TOMOGRAPHY

BACKGROUND OF THE INVENTION

1. Field of the Invention

The invention generally relates to the field of short optical pulse characterization and, more particularly, to characterizing optical pulses using chronocyclic tomography.

2. Description of the Related Art

In optical communications systems, it is necessary to characterize the phase and amplitude of optical pulses as accurately as possible in order to predict and mitigate signal degradation. For example, in long distance wavelength-division multiplexed (WDM) systems, transmitted optical signals are subjected to nonlinear effects, such as self-phase modulation or cross-phase modulation, which degrade the transmission properties of the optical signals. By characterizing received optical pulses, an optical communication system may employ corrective measures to compensate for the effect of the distortions on a propagating optical signal.

As the need for information increases, so does the demand for higher speed and higher capacity communication systems. Higher speed communication systems result in both shorter optical pulses for transmission at higher bit rates (e.g., approximately 8 ps pulses for 40 Gb/s systems), and fast optical components to process the higher bit rate optical signals. As optical pulses are now used that are shorter in duration than the response time of the fastest available photodetectors, optical communications systems require more elaborate diagnostics to characterize the optical pulses. One approach to characterizing short optical pulses involves the use of tomographic techniques to reconstruct the electric field of an optical pulse. The Wigner-Ville (W-V) distribution of a short optical pulse is a time frequency distribution. The action of all filters or measurement devices on a short pulse can be expressed as mathematical operations on its Wigner function. A typical example is that measuring the optical spectrum of the pulse is equivalent to projecting the Wigner-Ville function of the pulse on the frequency axis. Tomographic techniques use several projections, i.e. the projections on several different axes, to reconstruct the W-V function and the electric field of the pulse. The most general tomographic technique uses a large number of projections of the W-V distribution on various axes and reconstructs the electric field using a back projection algorithm (referred to herein as the "complete chronocyclic technique"). It is mathematically equivalent to project the W-V function on various axes or to rotate the W-V function and project it on a fixed axis. However, the latter is easier experimentally, since a spectrometer may be used to project the W-V function on the frequency axis and an arbitrary rotation of the W-V distribution may be implemented in chronocyclic space by combining quadratic spectral phase modulation and a quadratic temporal phase modulation. However, using the complete chronocyclic technique to characterize optical pulses is undesirable, since a large rotation of the W-V function requires a large bandwidth. In addition, since the complete chronocyclic technique requires many projections of the W-V distribution, the complete chronocyclic technique requires the measurement of a large number of one-dimensional spectra to obtain the one-dimensional electric field of an optical pulse under test.

In another tomographic approach, only two projections of the W-V function are used: the frequency marginal (i.e., the spectral intensity of the optical pulse), and the time-marginal (i.e., the temporal intensity of the optical pulse) (referred to herein as the "time-to-frequency conversion technique"). The time marginal is obtained by rotating the W-V function by $\pi/2$ radians and measuring the spectrum of the resulting field. The time-to-frequency conversion technique, however, still requires a large bandwidth due to the large rotation of the W-V function. In addition, the time-to-frequency conversion technique does not adequately yield the electric filed, since the retrieval of the electric field from the spectral and temporal intensities is ambiguous.

SUMMARY OF THE INVENTION

These and other deficiencies of the prior art are addressed by the present invention of a method and apparatus for characterizing an optical pulse using a reduced complexity chronocyclic tomography. In one embodiment, a train of optical pulses is modulated using quadratic temporal phase modulation. A first spectral intensity of the optical pulse train is measured after a quadratic temporal phase modulation having a first amplitude. A second spectral intensity of the train of optical pulses is then measured in response to the quadratic temporal phase modulation having a second amplitude. At least one of the group delay and the spectral intensity associated with the train of optical pulses is computed using the first spectral intensity and the second spectral intensity.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for characterizing optical pulses using reduced complexity chronocyclic tomography is described. One or more aspects of the invention relate to a self-referencing technique to characterize the temporal electric field of short optical pulses. The group delay of an optical pulse is directly obtained from the angular derivative of the frequency marginal of its rotated Wigner-Ville (W-V) function in the chronocyclic space. Although the present invention will be described within the context of a diagnostic system for use with an optical communications system, those skilled in the art will appreciate that the present invention may be advantageously implemented in substantially any application where it is desirable to characterize optical pulses.

FIG. 1 illustrates the reduced complexity chronocyclic tomography of the present invention in contrast to previous techniques. In particular, FIG. 1A depicts a graph illustrating a generalized W-V distribution 100 of an optical pulse in chronocyclic space. An axis 102 represents frequency, and an axis 104 represents time. In complete chronocyclic tomography, the W-V distribution 100 is projected onto the frequency axis 102 for many rotations of the W-V distribution 100 in the chronocyclic space. For example, the W-V distribution may be rotated in the direction indicated by arrow 106 for many angles, $\alpha$. The principle of complete chronocyclic tomography is illustrated in FIG. 1B, which depicts a graph illustrating the W-V distribution 100 rotated through a multiplicity of angles between 0 and $\pi$ radians. As described above, the large angle of rotation of the W-V distribution 100 associated with complete chronocyclic tomography requires a large bandwidth.

Figure 1A:
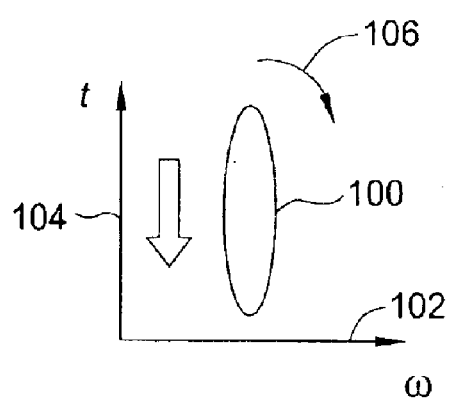
FIG. 1A depicts a graph showing an exemplary Wigner-Ville function of an optical pulse in chronocyclic space.
Figure 1B:
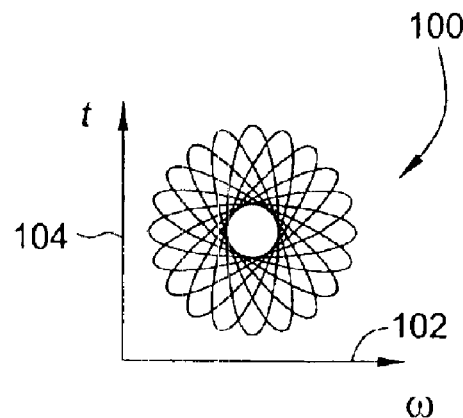
FIG. 1B depicts a graph showing the Wigner-Ville function of FIG. 1A rotated in chronocyclic space through a multiplicity of angles between 0 and $\pi$ radians.
Figure 1C:
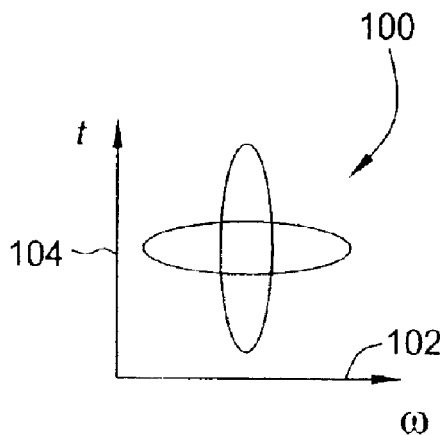
FIG. 1C depicts a graph showing the Wigner-Ville function of FIG. 1A rotated through two angles of 0 and $\pi/2$ radians.

The principle of time-to-frequency conversion tomography is illustrated in FIG. 1C, which depicts a graph showing the W-V distribution 100 rotated through two angles of 0 and $\pi/2$ radians, respectively. The spectral intensity of the optical pulse may be obtained by projecting the W-V distribution 100 having an angle of 0 radians onto the frequency axis 102, and the temporal intensity of the optical pulse may be obtained by projecting the W-V function 100 having an angle of $\pi/2$ radians onto the frequency axis 102. While time-to-frequency conversion tomography reduces the amount of projections of the W-V function 100, such a technique still requires a large angle of rotation of the W-V distribution 100, which in turn requires a large bandwidth.

Figure 1D:
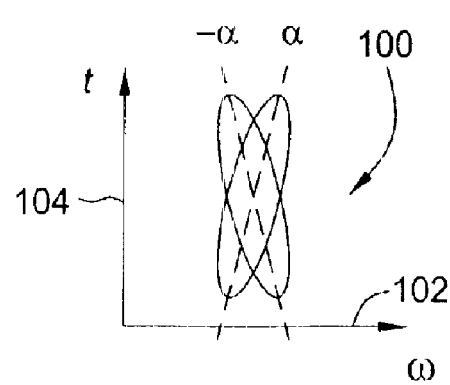
FIG. 1D depicts a graph showing the Wigner-Ville function of FIG. 1A rotated through two small angles, $-\alpha$ and $\alpha$, in accordance with the present invention.

FIG. 1D depicts a graph showing the W-V distribution 100 of an optical pulse rotated through two small angles, $-\alpha$ and $\alpha$, in accordance with one or more aspects of the present invention. The present invention employs a reduced complexity chronocyclic tomography technique to directly reconstruct the electric field of an optical pulse. In particular, the present invention uses the relation between the group delay in the optical pulse and the angular derivative of the projection of the rotated W-V distribution 100. The reduced complexity chronocyclic tomography of the present invention requires only two projections of the W-V distribution 100 onto the frequency axis 102. In contrast to the time-to-frequency conversion tomographic technique, however, the reduced complexity chronocyclic tomography of the present invention directly and unambiguously reconstructs the electric field of an optical pulse without any assumption. In addition, as described in more detail below, the present invention advantageously employs two small angle rotations of the W-V distribution 100 in chronocyclic space, which requires less bandwidth than either the complete chronocyclic tomography, or the time-to-frequency conversion tomography.

Figure 2:
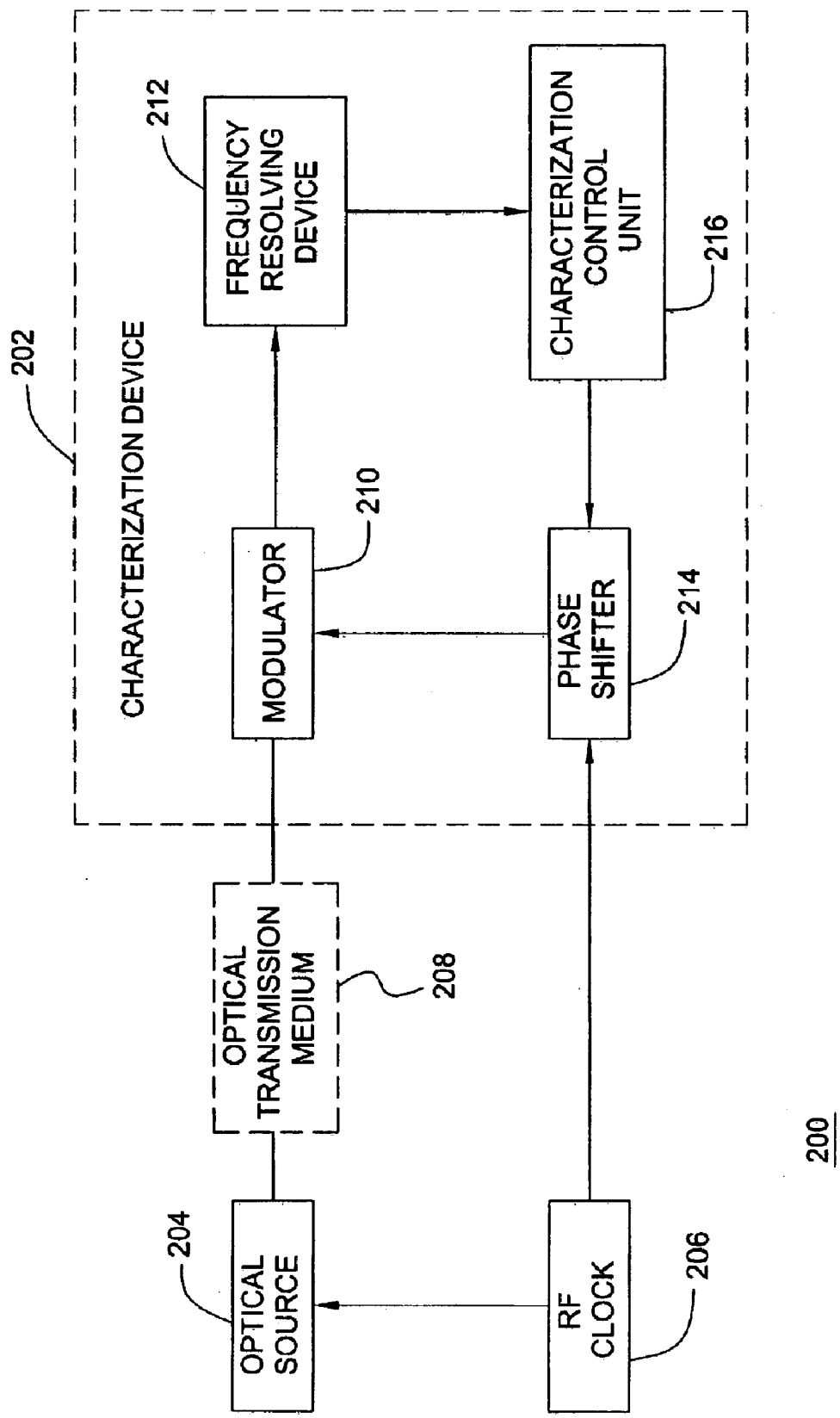
FIG. 2 depicts a block diagram showing one embodiment of a diagnostic system employing an exemplary optical pulse characterization device in accordance with one or more aspects of the invention.

FIG. 2 depicts a block diagram showing one embodiment of a diagnostic system 200 employing an exemplary optical pulse characterization device 202 in accordance with one or more aspects of the invention. Diagnostic system 200 may be employed with an optical communications system to characterize optical pulses. The diagnostic system 200 illustratively comprises an optical source 204, a radio frequency (RF) clock 206, an optical transmission medium 208, and the optical pulse characterization device 202. The RF clock 206 generates an RF signal having a predefined frequency. The output of the source 204 is a train of substantially identical optical pulses at a rate determined by the frequency of the RF signal produced by the RF clock 206. The optical source 204 may be an actively mode-locked fiber laser or like type optical source known in the art. Alternatively, the optical source 204 may be a continuous-wave laser, the output of which is modulated using an optical modulator, such as a Mach-Zehnder modulator (MZM), to produce the train of optical pulses.

The optical source 204 is coupled to the optical pulse characterization device 202 through the optical transmission medium 208. Notably, the optical pulse characterization device 202 may be used to determine the temporal electric field of the optical pulses at the output of the transmission medium 208. The optical pulse characterization device 202 may be located after any optical transmission medium 208 of known or unknown properties, so that the characterization of the pulses after such propagation is obtained. In another embodiment, the optical transmission medium 208 is not present and the optical pulse characterization device 202 characterizes the pulses at the output of the optical source 204.

In one embodiment of the invention, the optical pulse characterization device 202 comprises a temporal phase modulator 210, a frequency-resolving device 212, a phase shifter 214, and a characterization control unit 216. One input of the phase shifter 214 is coupled to the RF clock 206 for receiving the RF signal, and another input of the phase shifter 214 is coupled to the control circuitry 216 for receiving a phase control signal. An output of the phase shifter 214 provides a drive signal, which is coupled to the temporal phase modulator 210. The phase shifter 214 selectively controls the phase or relative delay of the drive signal with respect to the RF signal in accordance with the phase control signal from the characterization control unit 216. For example, the phase shifter 214 may be a voltage-controlled phase shifter and the phase control signal may be a voltage signal. Those skilled in the art will appreciate that other types of phase shifters or delay units may be used that are known in the art. In general, the phase shifter 214 supplies a drive signal to the temporal phase modulator 210 that is either synchronized, or delayed by a predefined amount, with respect to the RF signal that is used to drive the optical source 204.

The optical input of the temporal phase modulator 210 receives the train of optical pulses, and the RF input of the temporal phase modulator 210 is coupled to the phase shifter 214 for receiving the drive signal. The temporal phase modulator 210 may be a Lithium Niobate phase modulator or like-type temporal phase modulators known in the art. The temporal phase modulator 210 modulates the temporal phase of the optical pulses in the train in accordance with the drive signal in a well-known manner. The optical output of the temporal phase modulator 210 provides a modulated train of optical pulses.

An optical input of the frequency-resolving device 212 is coupled to the temporal phase modulator 210 for receiving the modulated train of optical pulses. The frequency-resolving device 212 may be an optical spectrum analyzer (OSA). Alternatively, the frequency-resolving device 212 may be implemented using a Fabry-Perot etalon followed by a photodiode. The frequency-resolving device 212 measures the spectral intensity of optical pulses in a well-known manner. An output of the frequency-resolving device 212 provides a signal proportional to the spectral intensity of the optical input. Those skilled in the art will appreciate that other types of frequency-resolving devices may be used with the invention that are capable of measuring the spectral intensity of optical pulses.

An input of the characterization control unit 216 is coupled to the frequency-resolving device 212 for receiving the measured spectral intensities. An output of the characterization control unit 216 is coupled to the phase shifter 214 for providing the phase control signal. Using the phase control signal, the characterization control unit 216 causes the phase shifter 214 to shift the phase of the drive signal with respect to the RF signal. In this manner, the characterization control unit 216 controls the modulation of the temporal phase of the optical pulses in the train. As described in more detail below, the characterization control unit 216 controls the drive signal such that the optical pulses can be modulated using quadratic temporal phase modulation of varying signs and magnitude. The characterization control unit 216 then analyzes a first spectral intensity of optical pulses having a quadratic temporal phase modulation exhibiting a first small amplitude, and a spectral intensity of optical pulses having a quadratic temporal phase modulation exhibiting a second small amplitude. The characterization control unit 216 then uses the two measured spectra to reconstruct the group delay and the spectral intensity of the optical pulses under test, which may be used to compute the electric field.

Figure 3:
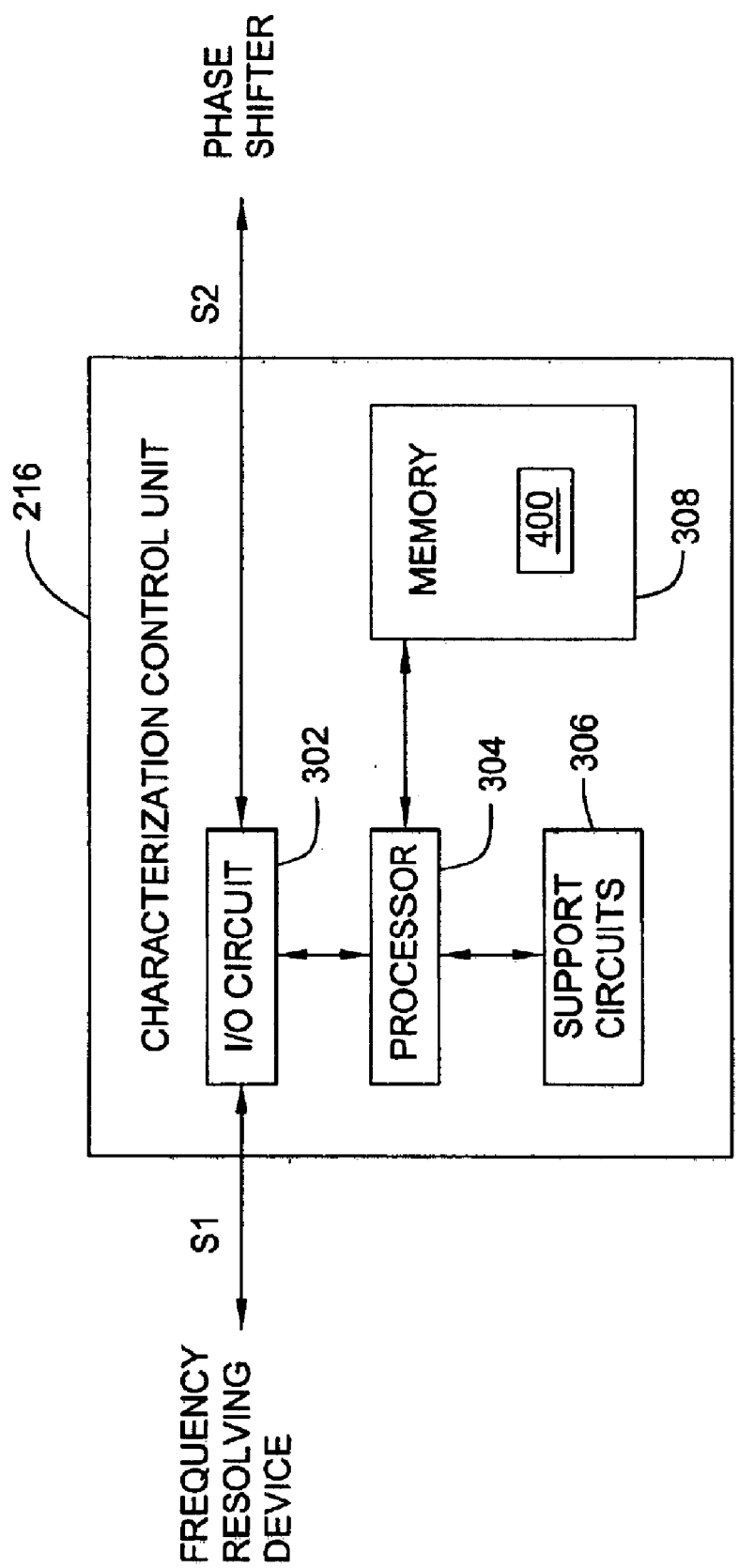
FIG. 3 depicts a block diagram showing one embodiment of the characterization control unit in accordance with one or more aspects of the invention.

FIG. 3 depicts a block diagram showing one embodiment of the characterization control unit 216 in accordance with one or more aspects of the invention. The characterization control unit 216 comprises a processor 304, memory 308, support circuits 306, and an input/output (I/O) circuit 302. The memory 308 may be random access memory, read only memory, removable storage, hard disc storage, or any combination of such memory devices. The memory 308 may store algorithms, control programs, and spectral intensity data. For example, memory 308 may store a temporal characterization process 400. The processor 304 may be any type of microcontroller or central processing unit known to those skilled in the art. The processor 304 cooperates with conventional support circuits 306, such as power supplies, clock circuits, cache memory, and the like, as well as circuits that assist in executing the software routines stored in the memory 308. The I/O circuit 302 forms an interface between the various functional elements communicating with the characterization control unit 216. For example, in the embodiment of FIG. 2, the characterization control unit 216 communicates with the frequency resolving device 212 via a signal path S1, and with the phase shifter 214 via a signal path S2.

Although the characterization control unit 216 is illustratively disclosed as being implemented as a processor executing a software program stored in a memory, those skilled in the art will appreciate that the characterization control unit 216 may be implemented in hardware, software, or a combination of hardware and software. Such implementations may include a number of processors independently executing various programs and dedicated hardware, such as application specific integrated circuits (ASICs), field programmable gate arrays (FPGAs), discrete circuits, or the like.

The reduced complexity chronocyclic tomography of the present invention employs the relation between the group delay in an optical pulse and the angular derivative of the projection of the rotated W-V distribution of the optical pulse in the chronocyclic space to directly reconstruct the electric field of the optical pulse. The analytic signal of the electric field of the optical pulse under test may be written in the frequency domain as:

$$\tilde{E}(\omega) = \sqrt{I(\omega)} \exp(i\phi(\omega)) \qquad \text{Eq. 1,}$$

where $\tilde{E}$ represents the electric field in the frequency domain, $I$ represents the spectral intensity, $\phi$ represents the spectral phase, $\omega$ represents angular frequency, and $i$ denotes the square root of $-1$, i.e., $\sqrt{-1}$. The W-V distribution, W, may then be expressed as:

$$W(t, \omega) = \int \tilde{E}\left(\omega - \frac{\omega'}{2}\right) \cdot \tilde{E}^*\left(\omega + \frac{\omega'}{2}\right) \cdot \exp(-i\omega' t) \frac{d\omega'}{2\pi} \qquad \text{Eq. 2,}$$

The integral in Equation 2, as well as all integrals henceforth, are from $-\infty$ to $\infty$.

The spectral intensity of an optical pulse (also referred to as the frequency marginal) is obtained as the projection of the W-V distribution on the frequency axis along the time axis, as shown by the following equation:

$$I(\omega) = \int W(t, \omega) dt \qquad \text{Eq. 3.}$$

The fractional power spectrum (i.e., the projection on the frequency axis of the W-V distribution rotated by an angle $\alpha$) is as follows:

$$I_\alpha(\omega) = \int W[t \cos(\alpha) + \omega \sin(\alpha), \omega \cos(\alpha) - t \sin(\alpha)] dt \qquad \text{Eq. 4.}$$

For a small rotation (i.e., $\alpha \ll 1$), the fractional power spectrum may be written as:

$$I_\alpha(\omega) = \int W(t + \omega\alpha, \omega - t\alpha) dt \qquad \text{Eq. 5.}$$

The derivative of the fractional power spectrum with respect to $\alpha$ (i.e., the angular derivative of the fractional power spectrum) is:

$$\frac{\partial I_\alpha}{\partial \alpha} = \int \left[\omega \frac{\partial W}{\partial t} - t \frac{\partial W}{\partial \omega}\right] dt = -\frac{\partial}{\partial \omega} \int t W dt \qquad \text{Eq. 6,}$$

where $\partial$ denotes a partial derivative operation. Note that while Equation 6 holds for a small rotation of the W-V distribution, Equation 6 also holds for a small shear, $\alpha$, along the frequency axis, in which case the W-V distribution may be written as $W(t, \omega - t\alpha)$. This is important from a practical viewpoint, since both a quadratic temporal phase modulation and a quadratic spectral phase modulation are needed to produce a rotation of the W-V distribution in chronocyclic space, but a shear only requires a quadratic temporal phase modulation.

The group delay, $\partial\phi/\partial\omega$, of an optical pulse is equal to the first order temporal moment of the W-V distribution, as shown by:

$$\frac{\partial \varphi}{\partial \omega} = \frac{\int t W(t, \omega)}{I(\omega)} \qquad \text{Eq. 7.}$$

As such, the angular derivative of the fractional power spectrum may be expressed as follows:

$$\frac{\partial I_\alpha}{\partial \alpha} = -\frac{\partial}{\partial \omega}\left[I(\omega)\frac{\partial \varphi}{\partial \omega}\right] \qquad \text{Eq. 8.}$$

Therefore, the group delay, $\partial\phi/\partial\omega$, may be obtained from the angular derivative of the fractional power spectrum, i.e., the frequency marginal of the W-V distribution rotated in the chronocyclic space.

In one embodiment of the invention, optical pulses in the train are modulated using a phase modulation having a form of $(\psi/2)t^2$, where $\psi$ is a finite amplitude. The modulated electric field associated with the modulated optical pulse can be expressed in the time domain as:

$$E(t)\exp\left[i\frac{\psi}{2}t^2\right] \qquad \text{Eq. 9.}$$

The corresponding W-V distribution can be expressed as $W(t,\omega+\psi t)$. From Equation 8 derived above, one has directly:

$$\frac{\partial I_\psi}{\partial \psi} = \frac{\partial}{\partial \omega}\left[I(\omega)\frac{\partial \varphi}{\partial \omega}\right] \qquad \text{Eq. 10,}$$

where $I_{104}$ is the spectral intensity of the modulated optical pulses.

The derivative of Equation 10 may be obtained from a finite difference, i.e., from two measurements of the spectral intensity for a small finite change in the amplitude of the temporal modulation of the optical pulses. For example, the spectral intensities $I_\psi$ and $I_{-\psi}$ may be used, where $\psi$ is a finite amplitude. Equation 10 may be integrated twice in order to obtain the spectral phase $\phi(\omega)$ of the optical pulse under test. The spectral intensity, $I(\omega)$, may be obtained directly as the arithmetic average of the two measured spectra, $I_\psi$ and $I_{-\psi}$. The electric field can then be calculated using Eq. 1.

With renewed reference to FIG. 2, in one embodiment of the invention, the temporal phase modulator 210 is driven by a sinusoidal drive signal that provides the following phase modulation to the optical pulses:

$$\phi(t)=\phi_0 \cos[\Omega(t-\tau)] \qquad \text{Eq. 11,}$$

where $\phi_0$ is the amplitude of the phase modulation, $\Omega$ is the angular frequency of the drive signal, and $\tau$ is the phase shift or delay of the drive signal relative to the RF signal. Expressing $\psi=\phi_0\Omega^2$ yields a quadratic temporal phase modulation of $-\frac{1}{2}\psi t^2$, if the optical pulses are synchronized with a maximum of the phase modulation (i.e., $\tau=0$). A quadratic temporal phase modulation of $\frac{1}{2}\psi t^2$ is obtained if the optical pulses are synchronized with a minimum of the phase modulation (i.e., $\tau=\pi/\Omega$). The condition for quadratic temporal phase modulation is that $\Omega^2 t^2 \ll 1$ on the temporal support of the optical pulse.

The proper delays for the two spectrum measurements, $I_\psi$ and $I_{-\psi}$, are set using the phase shifter 214. The calibration of the absolute delays and peak-to-peak phase modulation is achieved by measuring the spectrum of the modulated optical pulse as a function of the delay. The shift in optical frequency is expressed as follows:

$$-\frac{\partial \varphi}{\partial t} = \varphi_0\Omega\sin[\Omega(t-\tau)] \qquad \text{Eq. 12.}$$

The shift in optical frequency may be obtained from the centroid of the spectrum of the modulated optical pulse. From the shift as a function of $\tau$, $\phi_0$ is obtained, as well as the value of the two delays for proper synchronization with the maximum and the minimum of the phase modulation. In the example discussed below with respect to FIGS. 5 and 6, $\Omega/2\pi$ was equal to 10 GHz and $\phi_0$ was equal to 1.3 radians.

Figure 4:
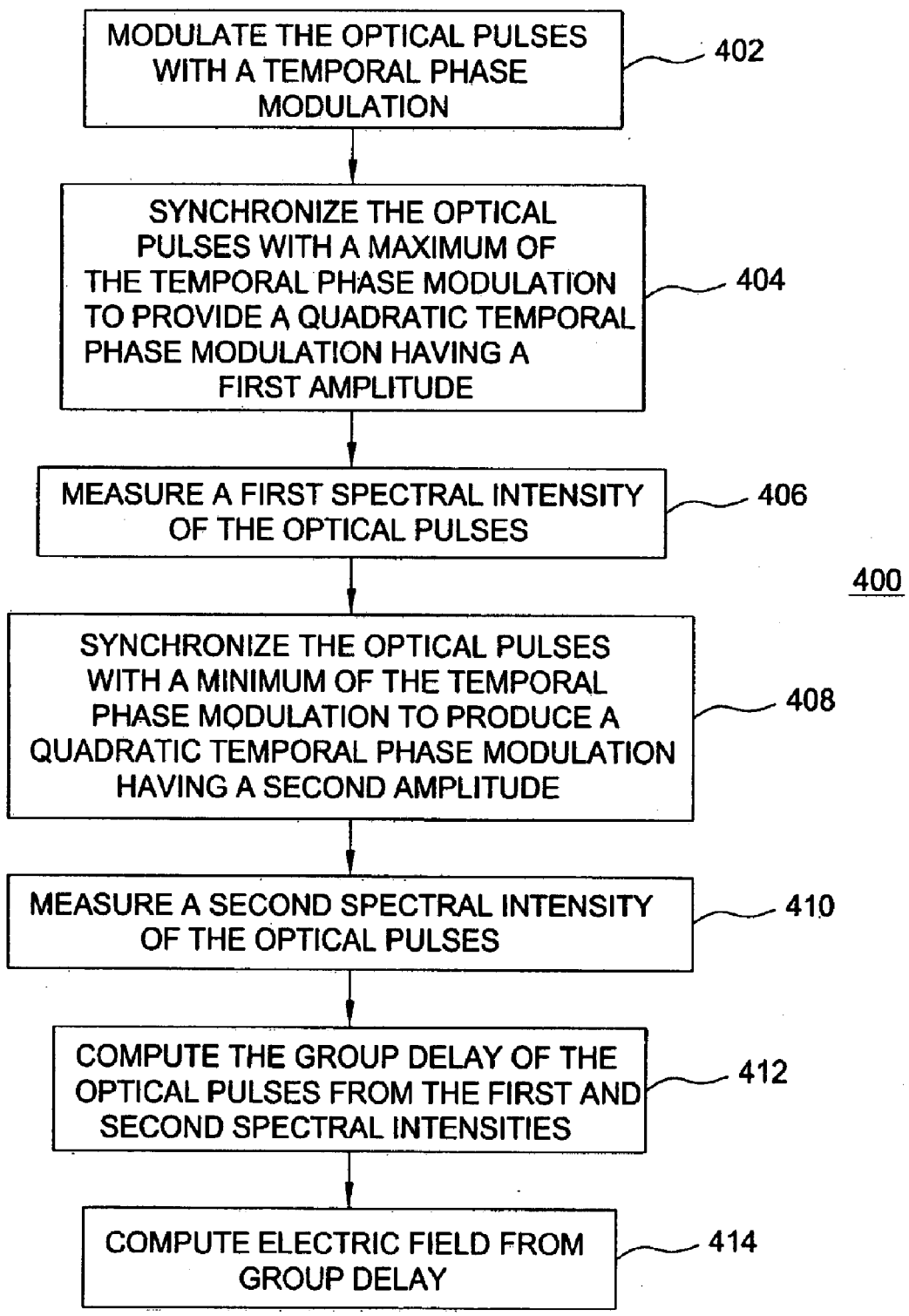
FIG. 4 depicts a flow diagram showing one embodiment of a temporal characterization process in accordance with one or more aspects of the invention.

FIG. 4 depicts a flow diagram showing one embodiment of a temporal characterization process 400 in accordance with one or more aspects of the invention. The process 400 begins at step 402, where the optical pulses are modulated with a temporal phase modulation. At step 404, the optical pulses are synchronized with a maximum of the temporal phase modulation to produce a quadratic temporal phase modulation having a first amplitude. For example, a quadratic temporal phase modulation of $-\frac{1}{2}\psi t^2$ may be employed, as described above. At step 406, a first spectral intensity of the optical pulses is measured.

At step 408, the optical pulses are synchronized with a minimum of the temporal phase modulation to produce a quadratic temporal phase modulation having a second amplitude. For example, a quadratic temporal phase modulation of $\frac{1}{2}\psi t^2$ may be employed, as described above. At step 410, a second spectral intensity of the optical pulses is measured.

At step 412, the spectral intensity of the optical pulses is calculated as the average of the first spectral intensity measured at step 406 and the second spectral intensity measured at step 410. The group delay of the optical pulses is computed using the first spectral intensity measured at step 406, and the second spectral intensity measured at step 410 using Equation 10 described above. Finally, at step 414, the electric field of the optical pulses may be computed using the spectral intensity and group delay. For example, as understood by those skilled in the art, the group delay may be integrated to produce the spectral phase of the optical pulses. The spectral intensity of the optical pulses is obtained as described above. As such, the electric field in the frequency domain may be constructed. The temporal electric field is related to the electric field in the frequency domain by the well-known Fourier transform.

In an experiment, the inventors generated a 10 GHz train of identical picosecond pulses using an actively mode-locked fiber laser (Pritel optical clock). The optical source was synchronized to a 10 GHz RF clock, which was also used to drive the modulator. The optical pulses before and after propagation in 179 m and 330 m of SSMF were characterized.

Figure 5:
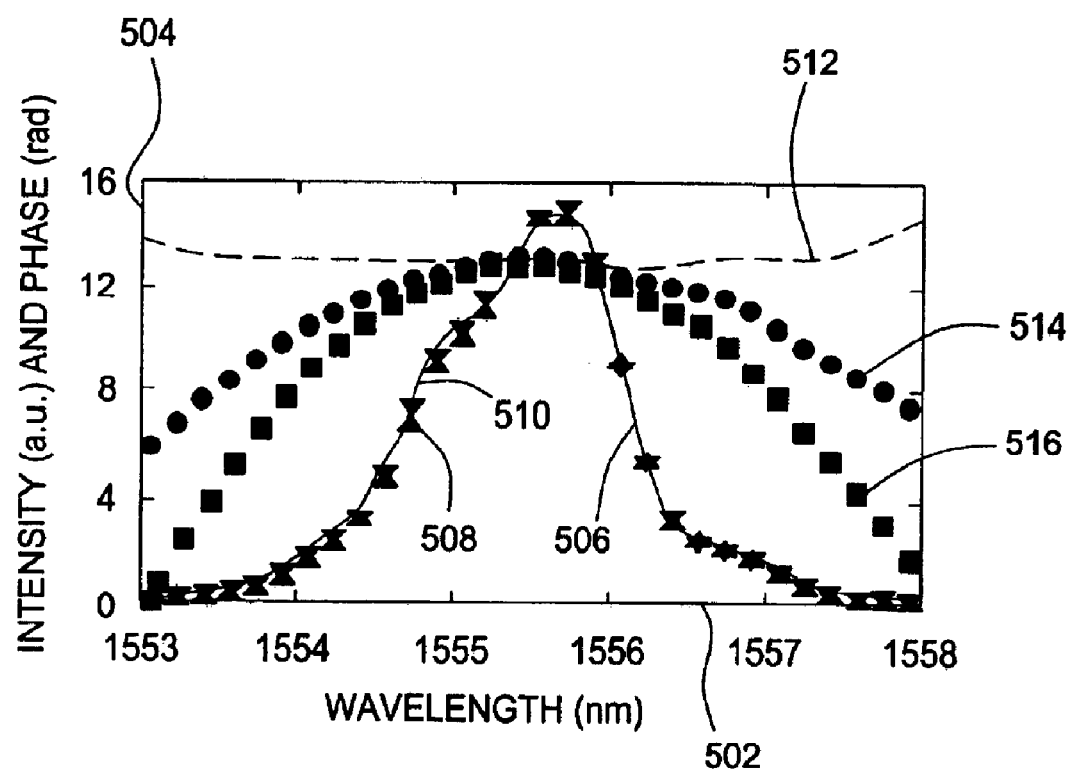
FIG. 5 depicts a graph showing the initial spectral intensity and spectral phase of optical pulses and exemplary spectral intensities and spectral phases of optical pulses after transmission through standard signal mode fiber.

FIG. 5 depicts a graph showing the spectral intensity and spectral phase of the optical pulses before transmission, after transmission through 179 m of SSMF, and after transmission through 330 m of SSMF. Axis 502 represents wavelength in nanometers, and axis 504 represents intensity in a.u. and phase in radians. With respect to optical pulses before transmission, a trace 506, indicated by a solid line, represents the spectral intensity, and a trace 512, represented by a dashed line, represents the spectral phase. With respect to optical pulses after transmission through 179 m SSMF, a trace 508, indicated by upwardly directed triangles, represents the spectral intensity, and a trace 514, indicated by circles, represents the spectral phase. With respect to optical pulses after transmission through 330 m of SSMF, a trace 510, indicated by downwardly directed triangles, represents the spectral intensity, and a trace 516, indicated by a squares, represents the spectral phase.

As expected, the spectral intensity of the three pulses is the same, but the spectral phase acquires a large quadratic component due to dispersion. The extracted second order dispersions for the 179 m and 330 m fibers are 3.8 ps$^2$ and 7.1 ps$^2$, respectively. These extracted values are in agreement with the calculated dispersions equal to 3.8 ps$^2$ and 7.0 ps$^2$, respectively. When the two spans of 179 m and 330 m of optical fiber were concatenated, the characterization of the output pulses led to a measured second order dispersion of 11.5 ps$^2$. The slight mismatch with the expected value of 10.8 ps$^2$ is attributed to the longer duration of the optical pulses (more than 20 ps). The assumption of quadratic temporal phase modulation on the temporal support of the pulse is therefore no longer accurate.

Figure 6A:
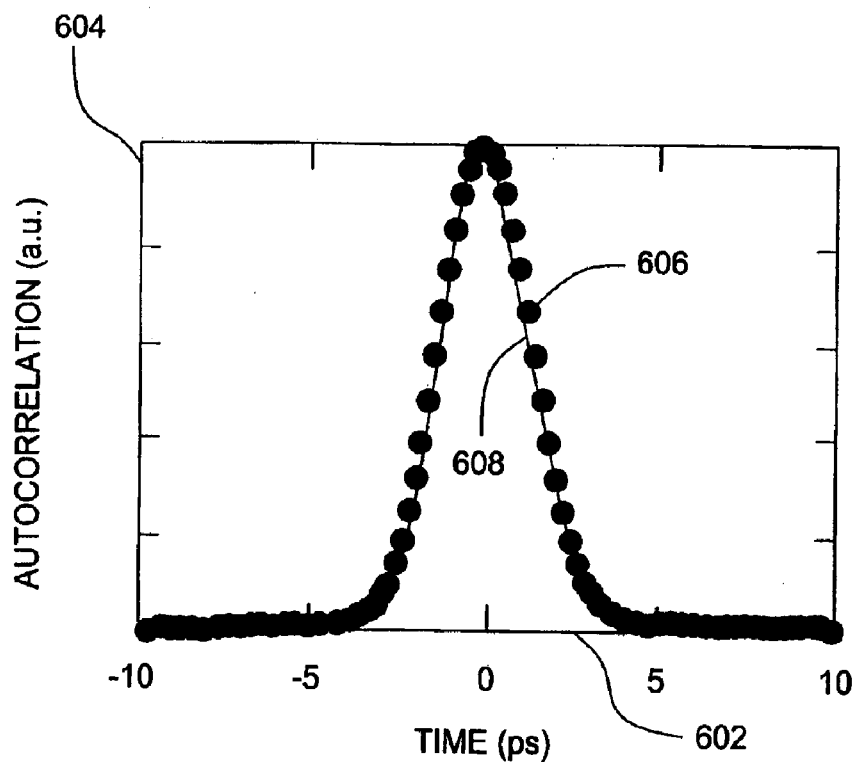
FIG. 6A depicts a graph showing the second order intensity autocorrelation for the initial optical pulses on a liner scale.
Figure 6B:
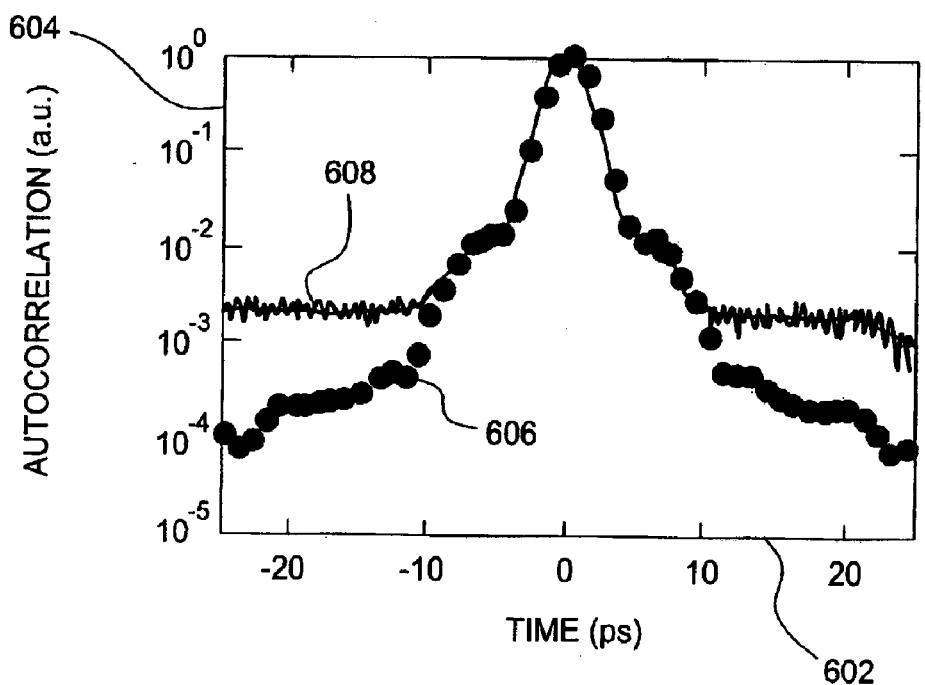
FIG. 6B depicts a graph showing the second order intensity autocorrelation for the initial optical pulses of FIG. 6A on a logarithmic scale.

FIG. 6A depicts a graph showing the second order intensity autocorrelation for the initial optical pulses on a liner scale. Axis 602 represents time in picoseconds, and axis 604 represents the autocorrelation in arbitrary unit (a.u.). A trace 606, indicated by circles, represents the second order auto-correlation calculated from an electric field using the present invention. A trace 608, indicated by a solid line, represents the second order autocorrelation as measured with a second order autocorrelator. As shown, there is substantial agreement between the trace 606 measured using the present invention and the trace 608 that was independently measured using the autocorrelator. The autocorrelator was a non-collinear intensity autocorrelator with a nonlinear crystal and a photomultiplier tube. The autocorrelation trace 608 was averaged over 1000 traces on an oscilloscope during one minute and has a dynamic range of about three orders of magnitude, due to the limited dynamic range of the photomultiplier tube and the low peak power of the optical pulses (average power of 7 mW, corresponding to a peak power of 350 mW at 10 GHz). In contrast, the present invention is based on linear optics. Therefore, the dynamic range of the present invention surpasses that of the autocorrelator without any averaging. FIG. 6B depicts a graph showing the second order intensity autocorrelation for the initial optical pulses of FIG. 6A, but on a logarithmic scale.

In another embodiment of the present invention, the quadratic temporal phase modulation is obtained using nonlinear optics. Notably, Cross-Phase Modulation (XPM) with an ancillary optical pulse, either provided inside the optical characterization device 202, or obtained from the optical pulse under test itself, implements a quadratic temporal phase modulation under the condition that the temporal intensity of the ancillary pulse is parabolic. The details of XPM are well known to those skilled in the art. For example, using a nonlinear medium with nonlinear coefficient γ and length L (for example a highly nonlinear fiber), and an ancillary pulse with temporal intensity $I_{ANCILLARY}(t)$ the electric field of the source under test is modified by the temporal intensity of the ancillary pulse following the equation $$E'(t)=E(t)\cdot\exp[2i\cdot L\cdot\gamma\cdot I_{ANVCILLARY}(t)] \qquad \text{Eq. 13.}$$

This, therefore, provides a quadratic temporal phase modulation of the electric field of the source under test, as needed for the present invention, provided that $I_{ANCILLARY}$ is parabolic over the temporal support of the source under test. The angle of rotation of the Wigner function in this embodiment is proportional to the peak power of the ancillary source. Therefore, two rotations of different angles can be obtained by varying the peak power of the ancillary source of pulses. For example, a zero-angle rotation is obtained when turning off the ancillary pulse, while a finite non-zero angle is obtained for a finite peak power of the ancillary pulse. The group delay can be reconstructed from two spectral intensities measured after nonlinear interaction, following the formalism presented in the previous embodiment.

In yet another embodiment of the present invention, the quadratic temporal phase modulation is obtained using nonlinear optics. Notably, nonlinear wave mixing with a linearly chirped ancillary optical pulse, either provided inside the optical characterization device 202 or obtained from the optical pulse under test itself, implements a quadratic temporal phase modulation. It is well known to those skilled in the art that the electric field of a chirped optical pulse has a quadratic temporal phase. Sum-frequency generation, for example by three-wave mixing in a nonlinear crystal or four-wave mixing in a highly nonlinear fiber, can be used to generate an electric field that is proportional to the product of the electric field under test and the electric field of the ancillary chirped pulse set at a given power depending on the nonlinear mechanism. For example, in three-wave mixing, the resulting electric field is proportional to the product of the electric field of the pulses under test and the electric field of the ancillary pulse. In four-wave mixing, the resulting electric field is proportional to the product of the electric field of the pulses under test and the square of the electric field of the ancillary pulse. Therefore, the resulting temporal electric field will be equal to the electric field of the pulses under test modulated by a quadratic temporal coming from the electric field of the ancillary chirped pulse. Such a nonlinear conversion can therefore be used to provide rotation of the Wigner-Ville function of the optical pulse under test. Rotations of various angles can be obtained by implementing nonlinear mixing with an ancillary chirped pulse of varying magnitude of linear chirp. The group delay can be reconstructed from two spectral intensities measured after nonlinear interaction with two ancillary pulses of different chirp, following the formalism presented in the previous embodiment.

While the foregoing is directed to illustrative embodiments of the invention, other and further embodiments of the invention may be devised without departing from the basic scope thereof, and the scope thereof is determined by the claims that follow.

What is claimed is:

1. A method, comprising:

modulating an optical pulse train using quadratic temporal phase modulation;

measuring a first spectral intensity of the optical pulse train after a quadratic temporal phase modulation having a first amplitude;

measuring a second spectral intensity of the optical pulse train after a quadratic temporal phase modulation having a second amplitude; and computing at least one of group delay and spectral intensity associated with the optical pulse train using the first spectral intensity and the second spectral intensity.

2. The method of claim 1, further comprising:

computing an electric field associated with the optical pulse train using the group delay and the spectral intensity.

3. The method of claim 1, wherein computing the group delay and the spectral intensity comprises:
averaging the first spectral intensity and the second spectral intensity to compute the spectral intensity;
calculating a derivative of the spectral intensity with respect to amplitude of the quadratic temporal phase modulation as a finite difference using the first and second spectral intensities; and
computing the group delay according to the equation:

$$\frac{\partial I_\psi}{\partial \psi} = \frac{\partial}{\partial \omega}\left[I(\omega)\frac{\partial \varphi}{\partial \omega}\right],$$

where $I_\psi$ is the spectral intensity of the optical pulse train having the quadratic temporal phase modulation, $\psi$ represents the amplitude of the quadratic temporal phase modulation, $\omega$ represents angular frequency, $I(\omega)$ is the spectral intensity of the optical pulse train, and $$\frac{\partial \varphi}{\partial \omega}$$

is the group delay.

4. The method of claim 1, wherein the modulating comprises:
coupling the optical pulse train to a quadratic temporal phase modulator; and
driving the quadratic temporal phase modulator with a sinusoidal RF signal.

5. The method of claim 4, wherein the measuring the first spectral intensity comprises synchronizing the optical pulse train with a maximum of the quadratic temporal phase modulation to provide a quadratic temporal phase modulation of negative sign and measuring a resulting optical spectrum; and wherein the measuring the second spectral intensity comprises synchronizing the optical pulse train with a minimum of the quadratic temporal phase modulation to provide a quadratic temporal phase modulation of positive sign and measuring a resulting optical spectrum.

6. The method of claim 1, wherein the modulating comprises:
providing an ancillary source of optical pulses; and
providing a nonlinear medium within which the optical pulses of the ancillary source cross-phase modulate the optical pulse train.

7. The method of claim 1, wherein the modulating comprises:
providing an ancillary source of linearly chirped optical pulses; and
providing a nonlinear medium to implement nonlinear mixing between the optical pulses of the ancillary source and the optical pulse train.

8. An apparatus, comprising:
means for providing quadratic temporal phase modulation on an optical pulse train;
a frequency-resolving device for measuring a first spectral intensity after a quadratic temporal phase modulation having a first amplitude and measuring a second spectral intensity after a quadratic temporal phase modulation having a second amplitude; and
a control unit for computing at least one of group delay and spectral intensity associated with the optical pulse train using the first spectral intensity and the second spectral intensity.

9. The apparatus of claim 8, wherein the means for providing quadratic temporal phase modulation comprises:
a temporal phase modulator having an optical input to receive the optical pulse train and an RF input; and
a phase shifter coupled to the RF input to provide a sinusoidal RF signal thereto.

10. The apparatus of claim 9, wherein the control unit is further configured to control the phase shifter to implement a first relative delay between the quadratic temporal phase modulation and the optical pulse train and a second relative delay between the quadratic temporal phase modulation and the optical pulse train.

11. The apparatus of claim 8, wherein the means for providing quadratic temporal phase modulation comprises:
an ancillary source of optical pulses; and
a nonlinear medium within which the pulses of the ancillary source cross-phase modulate the optical pulse train.

12. The apparatus of claim 11, wherein the nonlinear medium is a highly nonlinear optical fiber.

13. The apparatus of claim 8, wherein the means for providing quadratic temporal phase modulation comprises:
an ancillary source of linearly chirped optical pulses; and
a nonlinear medium for implementing nonlinear mixing between the pulses of the ancillary source and the optical pulse train.

14. The apparatus of claim 13, wherein the nonlinear medium includes a nonlinear optical crystal for implementing three-wave mixing.

15. The apparatus of claim 13, wherein the nonlinear medium includes a highly nonlinear optical fiber for implementing four-wave mixing.

16. The apparatus of claim 13, wherein the nonlinear medium includes a semiconductor optical amplifier for implementing four-wave mixing.

17. The apparatus of claim 8, wherein the control unit is further configured to compute an electric field associated with the optical pulse train using the spectral intensity and the group delay.

18. The apparatus of claim 8, wherein the frequency-resolving device is an optical spectrum analyzer.

19. The apparatus of claim 8, wherein the control unit is further configured to:
average the first spectral intensity and the second spectral intensity to compute the spectral intensity of the optical pulse train;
calculating the derivative of the spectral intensity with respect to amplitude of the quadratic temporal phase modulation as a finite difference using the first and second spectral intensities; and
compute the group delay according to the equation:

$$\frac{\partial I_\psi}{\partial \psi} = \frac{\partial}{\partial \omega}\left[I(\omega)\frac{\partial \varphi}{\partial \omega}\right],$$

where $I_\psi$ is the spectral intensity of the optical pulse train having the temporal phase modulation, $\psi$ represents the amplitude of the quadratic temporal phase modulation, $\omega$ represents the angular frequency, $I$ is the spectral intensity of the optical pulse train, and $$\frac{\partial \varphi}{\partial \omega}$$

is the group delay.

20. A method, comprising:
processing an optical pulse train such that a Wigner-Ville distribution associated with an optical pulse of the train is rotated by a first angle;
measuring a first spectral intensity of the optical pulse train in response to the first angle;

processing the train of optical pulses such that the Wigner-Ville distribution is rotated by a second angle;

measuring a second spectral intensity of the optical pulse train in response to the second angle; and computing at least one of spectral intensity and group delay associated with the optical pulse train using the first spectral intensity and the second spectral intensity.

21. The method of claim 20, further comprising:

computing an electric field associated with the optical pulse train using the group delay and the spectral intensity.

* * * * *